No. 688,862. Patented Dec. 17, 1901.
T. KELLY.
DRINKING CUP FOR POULTRY.
(Application filed July 20, 1901.)

(No Model.)

WITNESSES:
L. N. Legendre
A. A. Hovermann

INVENTOR
Thomas Kelly
BY William R. Baird
His ATTORNEY

UNITED STATES PATENT OFFICE.

THOMAS KELLY, OF WAPPINGERS FALLS, NEW YORK.

DRINKING-CUP FOR POULTRY.

SPECIFICATION forming part of Letters Patent No. 688,862, dated December 17, 1901.

Application filed July 20, 1901. Serial No. 69,069. (No model.)

*To all whom it may concern:*

Be it known that I, THOMAS KELLY, a citizen of the United States, residing at Wappingers Falls, in the county of Dutchess and State of New York, have invented a new and useful Improvement in Drinking-Cups for Poultry, of which the following is a specification.

My invention relates to drinking-cups for poultry, and has for its object the production of a cup which shall keep itself free from dirt and filth likely to fall into it and requires little or no attention after being put into place.

My invention consists, essentially, of a drinking-cup open at the top and closed at the bottom and provided with an overflow-pipe, whereby the water is discharged after filling the cup to a predetermined height. The overflow-pipe not only projects upward into the interior of the cup, but downward. At its lower extremity it is adapted to fit into a drain-pipe and where necessary is threaded, so as to screw into a threaded aperture provided in the drain, thus making it removable, but with a tight joint. The water is supplied from any suitable source, as a tank or barrel, by means of pipes provided with valve-controlled faucets, whereby the cups are each supplied with the water. A series of these cups may be placed in a system, so as to supply broods of poultry confined within adjacent inclosures from a common source of supply.

Figure 1:
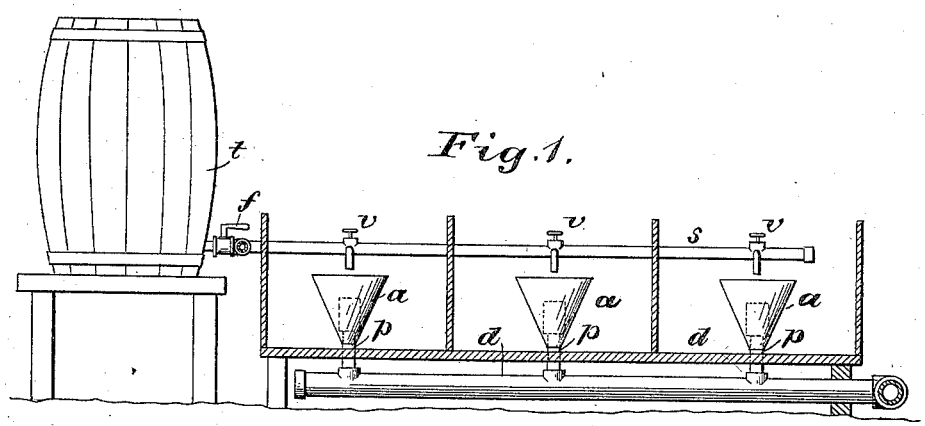
Figure 2:
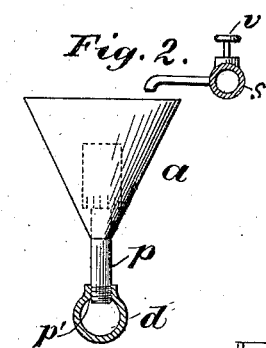
Figure 3:
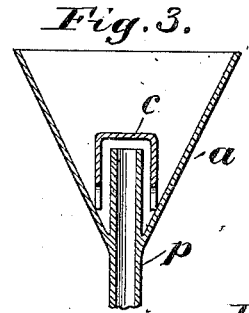
Figure 4:
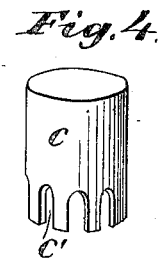
Figure 5:
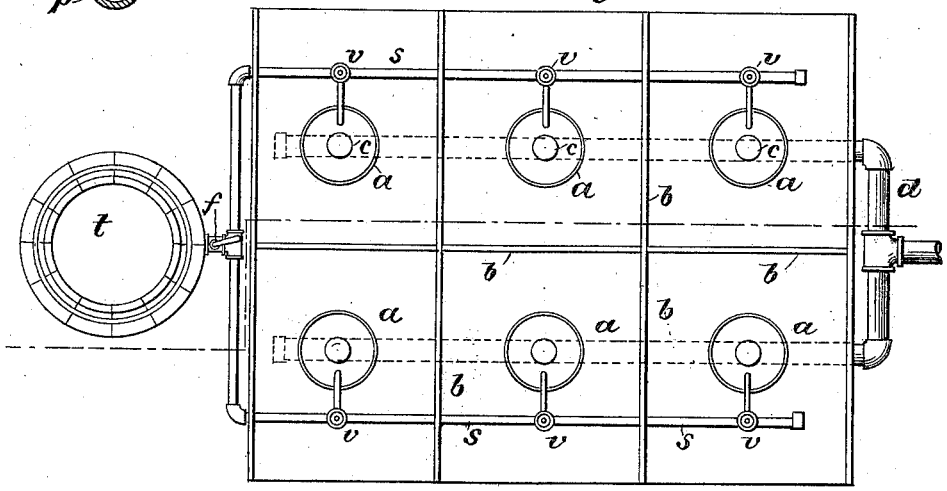

In the drawings, Figure 1 is an elevation of a water-tank and pipes and three of my improved cups and the drain for the same. Fig. 2 is a side view of and partial section on the plane of the line 2 2 in Fig. 1 looking to the right. Fig. 3 is a central vertical section of one of the cups, showing the overflow-pipe provided with its cap. Fig. 4 is a perspective view of the cap, and Fig. 5 is a diagram showing the cups arranged in series to supply adjacent inclosures.

In the drawings, $t$ is the tank containing the water to be supplied to the cups. It may be of any suitable size, form, or material and its place may be taken where convenient by a city source of water-supply or the like. It is supplied with a faucet $f$, whereby the outward flow of the water may be controlled. Leading from the tank $t$ is a pipe $s$. At suitable intervals it is provided with valves or faucets $v$, from which the water may be discharged into the cups.

The cups $a$ are made of tinned iron or other suitable material and with sloping sides. Each cup is closed at the bottom and open at the top and is provided with an overflow-pipe $p$, which projects upward into the body of the cup through the small end thereof and is closely embraced by said small end of the cup and is open at both ends. The upper end of the pipe is placed a little below the upper edge of the cup $a$ and the lower end is adapted to fit into an aperture in the drain-pipe $d$ made to receive it. Where an especially-tight joint is desired for any reason, the lower end of the pipe $p$ and the aperture in the drain $d$ are each threaded.

The cup made as described is efficient in use. The water flows in constantly and as constantly flows out, and the water being continually stirred from the bottom keeps aerated and sweet and has no tendency to become stale and flat. The fowls do not remain perched on the edge of the cup. They seem disturbed by the drip of the water. Any ordinary dirt soon overflows and passes down the overflow-pipe; but where it is persistent it can easily be removed by using the cap $c$. This consists of a cylinder, preferably made of glass and closed at the top, but open at the bottom and provided at its lower end with side openings, as $c'$, to permit the inward flow of the water. This cap is made of a larger internal diameter than the external diameter of the pipe $p$, and its lower end rests upon the sloping bottom of the cup, by which it is thereby supported, while its upper end is located above and out of contact with the top of the said pipe. When placed in position, as shown in Fig. 3, the current of water upward between the external surface of the pipe $p$ and the inner wall of the cap is sufficient to remove any dirt collecting at the bottom of the cup. Of course this cap is mainly useful where the cups cannot be easily lifted from the drain and inverted.

In Fig. 5 I show the cups arranged in a system to supply a poultry-yard divided by fences $b$ into separate inclosures for different broods, with the size of the cups shown obviously wholly out of proportion to that of the yards.

What I claim as new is—

1. A drinking-cup for poultry comprising a body having sloping walls and with its wider portion located at the top and open, an overflow-pipe inserted through the narrow bottom of said body and projecting therefrom upward into the latter, and a cap, having a closed top, arranged over said pipe and out of contact therewith, said cap having its lower end engaged with and supported by the sloping walls of the cup and formed with openings leading to the bottom of the space between it and the overflow-pipe.

2. The combination with a valve-controlled water-supply means, having a faucet, and a drain-pipe, of a drinking-cup having an open top located beneath said faucet so as to be supplied directly therefrom, said cup having its walls sloped inward from said top, an overflow-pipe extending from said cup downward to said drain-pipe, said overflow-pipe projecting through the small lower end of said cup and being closely embraced by the wall of the latter, and a cap, having a closed top, arranged over said overflow-pipe and out of contact therewith, said cap having its lower end engaged with and supported by the sloping walls of the cup and formed with openings leading to the bottom of the space between it and the overflow-pipe.

Witness my hand this 17th day of July, 1901, in the presence of two subscribing witnesses.

THOMAS KELLY.

Witnesses:
   JAMES T. ROY,
   ZACHARIAH V. HASBROOK.